United States Patent [19]

Hanke et al.

[11] 4,328,104
[45] May 4, 1982

[54] PROCESS OF DEMULSIFYING AND CONVERTING EMULSIONS OF OILS, GREASES AND FATS

[75] Inventors: Reinhart Hanke; Bertalan Treso, both of Leoben, Austria

[73] Assignee: Voest-Alpine Aktiengesellschaft, Vienna, Austria

[21] Appl. No.: 152,985

[22] Filed: May 27, 1980

[30] Foreign Application Priority Data

Jun. 28, 1979 [AT] Austria ................... 4556/79

[51] Int. Cl.³ .............................. C02F 3/28
[52] U.S. Cl. .................. 210/603; 210/610; 210/613; 210/708
[58] Field of Search ........... 210/2, 12, 13, 16, 43, 210/603, 604, 608, 610, 611, 612, 613, 708, 925, DIG. 5; 435/167, 801

[56] References Cited

U.S. PATENT DOCUMENTS

| 2,231,597 | 5/1938 | Shibata | 210/12 |
|---|---|---|---|
| 2,360,812 | 10/1944 | Kelly | 210/13 |
| 2,686,146 | 8/1954 | Buswell | 210/611 |
| 2,719,118 | 9/1955 | Bernard | 210/708 |
| 3,105,014 | 9/1963 | Harrison | 210/2 |
| 3,356,609 | 12/1967 | Bruemmer | 210/610 |
| 3,383,309 | 5/1968 | Chandler | 435/167 |
| 3,431,675 | 3/1969 | Moore | 210/611 |
| 3,640,846 | 2/1972 | Johnson | 435/801 |
| 3,787,316 | 1/1974 | Brink | 210/608 |
| 3,981,800 | 9/1976 | Ort | 210/16 |
| 4,022,665 | 5/1977 | Ghosh | 435/167 |
| 4,027,685 | 6/1977 | Heard | 210/708 |
| 4,124,501 | 11/1978 | Yen | 210/2 |
| 4,172,781 | 10/1979 | Walk | 210/7 |
| 4,213,857 | 7/1980 | Ishida | 210/12 |

FOREIGN PATENT DOCUMENTS

| 2805054 | 8/1978 | Fed. Rep. of Germany | 210/16 |
|---|---|---|---|
| 801144 | 9/1958 | United Kingdom | 210/16 |
| 2007205 | 5/1979 | United Kingdom | 210/12 |
| 2013170 | 8/1979 | United Kingdom | 210/2 |
| 612958 | 6/1978 | U.S.S.R. | 210/2 |

Primary Examiner—Ernest G. Therkorn
Attorney, Agent, or Firm—Cushman, Darby & Cushman

[57] ABSTRACT

It is proposed to demulsify and convert emulsions of oils, greases, and fats in that these emulsions are processed together with digested sludge or sludge liquor from a biological sewage treatment plant. The emulsions of oils, greases, or fats are fed after a first digesting step and preferably to a separate container. In that second digesting step, the bacteria growing under anaerobic conditions can convert much larger quantities of emulsions and the emulsions can be converted within a shorter time.

16 Claims, 3 Drawing Figures

PROCESS OF DEMULSIFYING AND CONVERTING EMULSIONS OF OILS, GREASES AND FATS

This invention relates to a process of demulsifying and converting emulsions of oils, greases, and fats, particularly of synthetic oils, such as cutting, cooling and lubricating fluids, of oils which contain sulfur and/or chloride salts, possibly in the presence of emulsifying agents or used scrubbing liquors or degreasing baths, wherein the emulsions are processed together with sewage sludges. Such emulsions, which may be oil-in-water or water-in-oil emulsions, are usually demulsified by chemical or electrochemical processes. The electrolytic demulsification is widely used in the processing of oil emulsions. Particularly with emulsions which contain nitrites and phosphates the subsequent processing is most difficult. It is already known to convert emulsions together with sludges, but that practice requires a much longer conversion time because the emulsions which are fed appear to adversely affect the activity of the bacteria.

It is an object of the invention to provide for the demulsification and conversion of such emulsions a particularly simple and effective process which involves only a low energy consumption and can be used for a simple separation of oils and other pollutants from sewage. This object is accomplished according to the invention essentially in that the emulsion to be demulsified and converted is added to a digested sludge or sludge liquor which has been obtained e.g. by a biological sewage treatment and has been subjected to a first digesting step, which involves mainly an acid fermentation and makes mainly organic acids and $CO_2$ available, the resulting mixture is subjected to a second digesting step that is conducted under anaerobic conditions and in an environment which differs from that of the first step and results mainly in an evolution of methane, the two digesting steps are carried out in two separate digesting tanks, and emulsion is fed to the second digesting tank.

In this context, a digested sludge is organic matter which has preferably a water content in excess of 90% by weight and is undergoing an anaerobic conversion or has been anaerobically stabilized, particularly a sludge which has been obtained in a biological sewage treatment plant and is being digested or has been completely digested. Surplus sludge as well as the sludge that becomes available before the socalled activating basin of a biological sewage treatment plant must be disposed of. In connection with biological and particularly with microbacterial treatment, the sludges are digested, thickened, flocculated, dewatered or dried. The products thus obtained may be burnt. Alternative processes of treating the sludge include composting together with carbonaceous matter, a recovery of metals from the ash and aerobic fermentation and drying. It has surprisingly been found that oil emulsions can be rapidly demulsified if they are added to sludge which is being digested and has previously been subjected to a first digesting step, which involves mainly an acid fermentation and results particularly in a formation of organic acids and $CO_2$. The emulsifying agents which are contained in the emulsions to stabilize the dispersed hydrophobic phase and to prevent coagulation are apparently biochemically inactivated by digested sludges so that the oils, greases, and/or fats are then rapidly adsorbed onto flocks of the sludge. In this stage, the sludge remains biologically active and can be reloaded when the emulsion has been demulsified. The biocenosis of such digested sludges after said first digesting step surprisingly permits a decomposition of impurities which usually can be eliminated only with great difficulty, such as nitrites and phosphates, so that the water which is withdrawn is free from such impurities. That decomposition of pollutants added to the sludge in the form of emulsions and the decomposition of the oils, greases, and fats themselves will be effected under particularly favourable conditions if the emulsion to be converted is fed to a digesting tank used for the digestion of the surplus sludge from a biological sewage treatment plant after a predigestion of that sludge. After the sludge has been predigested, the anaerobic microbacteria are apparently in a state of increased adaptability so that they can readily effect a biological decomposition of the nutrient which is offered to them in the form of an emulsion. For this reason, the digestion in the process according to the invention is divided into two steps. A first step comprises mainly an acid fermentation and results in a formation mainly of organic acids and $CO_2$. Emulsion is then added and mainly methane is evolved in the second step in an environment which differs from that of the first step. A complete demulsification of the emulsion and an almost complete conversion thereof will be permitted if the emulsion is added at the end of the first step or immediately thereafter. Because the two digesting steps are carried out in two separate digesting tanks and emulsion is added to the second digesting tank, there will be a strict separation between the environments for the two steps and the emulsion will not contact the digested sludge before the time at which the addition of the emulsion can no longer retard the digestion. As a result, the first step is independent of added emulsions and the biocenosis of the digested sludge which enters the second digesting step exhibits the optimum adaptability for the conversion of the emulsions. It has surprisingly been found that nitrites are decomposed in these cases by the biomass of the digested sludge, particularly by Nitrobacteriaciae without a supply of ammonium. Because the digestion of the sludge is usually part of a biological sewage treatment in conventional biological treatment plants, the process according to the invention can be carried out without a need for new plants so that the first-mentioned emulsions can be converted with high economy and without an appreciable increase of the residence time of the digested sludge in the digesting tank or tanks.

It is seen that the demulsification and conversion of emulsions is the result of an additional activity of the putrefactive bacteria and can be effected without a change of the energy required for the sludge digestion which is carried out in any case. Additional advantages can be obtained if the process is carried out in a suitable manner. In the first place, it will be desirable to add emulsion to the sludge, predigested sludge or sludge liquor in a quantity not in excess of 0.25 kg oil per kg of dry sludge solids in a continuous process or in a quantity of 0.25 to 1.0 kg oil per kg of dry sludge solids in a batch process. An addition of oil in such quantities will increase the carbon content, and if the bacteria are properly adaptable that increased carbon content may be utilized for an increased evolution of gas, particularly of methane. As has been mentioned hereinbefore, the adaptability of the bacteria depends on the time at which the emulsion is added to the sludge which is being digested. On the other hand, the sludge has owing to its higher carbon content a much higher calorific value, which can be utilized when the sludge is subsequently burnt. Owing to that higher calorific value the sludge can be burnt even when it has still a relatively high water content, after a shorter dewatering treatment. When the sludge is subsequently composted, the carbon which has been added by the oils, greases or fats will improve also the compost.

The digestion is usually effected in an anaerobic environment at temperature between 20° and 55° C. Within the scope of the present invention, a processing in the temperature range of 30° to 45° C. will be particularly desirable for an increased yield of methane.

In predigested sludge, the oil emulsion is usually demulsified within a few minutes. This time depends on the condition of the sludge and on the type of the emulsion. In a continuous digestion, a reliable demulsification and at least partial conversion can be ensured by a residence time of at least three days in the digesting tank.

The loading of the sludge flocks with the oil or grease which has become available by the demulsification of the emulsion should be as uniform as possible. For this purpose an oil-in-water emulsion is desirably fed to the sludge, digested sludge or sludge liquor.

With a view to higher gas yields and an improved energy balance it may be desirable to accept longer decomposition times and to feed oil to the sludge, digested sludge or sludge liquor in such a quantity that a C/N ratio in excess of 10 and preferably in excess of 15 is obtained. In the presence of properly adapted strains of bacteria such C/N ratios will permit a considerable growth of the population and a considerable improvement of the metabolic products. In the process according to the invention, this results in a preferential evolution of methane.

The growth of the cell substance will depend on the C/N ratio and on the energy supply. For this reason, carbon must be added for a growth of the cell substance. This addition of carbon can be effected in a particularly simple manner by the oil emulsions, which are also a waste product.

An addition of carbon is mainly important with poorly digestible high-nitrogen sludges, such as become available in agricultural operations. Particularly in such cases the digestion can be considerably improved by the addition of an oil emulsion.

If the digestion is effected at about 35° C., the emulsion will preferably be added after at least 10 days and more preferably after about 14 days. When it is assumed that the digestion at about 35° C. can be substantially completed within a cycle time of about 28 days, about 30% of the sludge will have been digested after about 10 days and about 50% after about 14 days. The biocenosis of such predigested sludge exhibits a surprisingly high adaptability and permits a particularly effective conversion of phosphates, nitrites, sulfur and carbonaceous matter. In this case the addition of the oil emulsion is comparable to a supply of nutrients for the bacteria.

Particularly desirable results will be obtained in the processing of emulsions which contain nitrites and/or heavy metals. The nitrites can be decomposed by the digestion and heavy metals can be recovered as the digested sludge is incinerated. The sludge laden with the demulsification products exhibits a particularly desirable behavior during flocculation and dewatering. Fresh surplus sludge in a biological sewage treatment and sludge liquor from properly adapted digested sludge may also be used for demulsification.

Illustrative embodiments for carrying out the process according to the invention are diagrammatically shown on the drawing, in which.

In all cases the process can be carried out as a continuous or batch process and the substances used for demulsification may consist of fresh sludge, predigested sludge, digested sludge, mixed fresh and digested sludges, and sludge liquor. The process can be described as an anaerobic fermentation.

Figure 1:
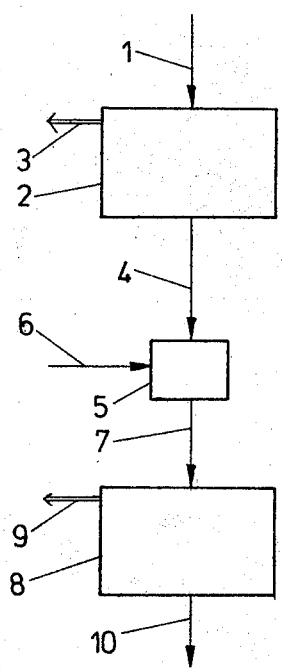
FIG. 1 shows a first embodiment in which the emulsion is fed to a partly digested sludge.

In accordance with FIG. 1, surplus sludge from biological sewage treatment plants is fed via conduit 1 to a digesting tank 2 in which the sludge is digested. The foul gases are withdrawn through a chimney 3. Predigested sludge is discharged from the digesting tank 2 through a conduit 4 and is mixed in a mixer 5 with the emulsion which is fed via a conduit 6. The mixture is transferred via a conduit 7 to another digesting tank 8 from which foul gases are withdrawn through a chimney 9. The sludge is discharged through conduit 10 and can then be processed further as described hereinbefore.

Figure 2:
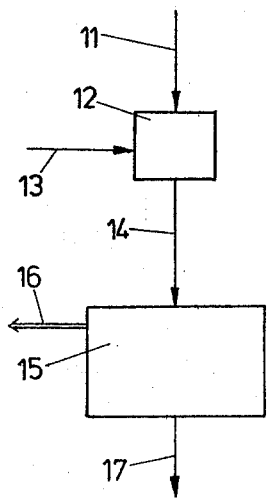
FIG. 2 shows diagrammatically a process in which emulsion is added to a sludge that has not been predigested.

In accordance with FIG. 2, surplus sludge from a biological sewage treatment plant is fed via a conduit 11 directly to a mixer 12 which is fed with emulsion via another conduit 13. The mixture is fed via a conduit 14 to a digesting tank 15, in which sludge digestion and demulsification are carried out at the same time. Foul gas is withdrawn from tank 15 through a pipe 16. Sludge is discharged through a conduit 17 and may be processed further.

Figure 3:
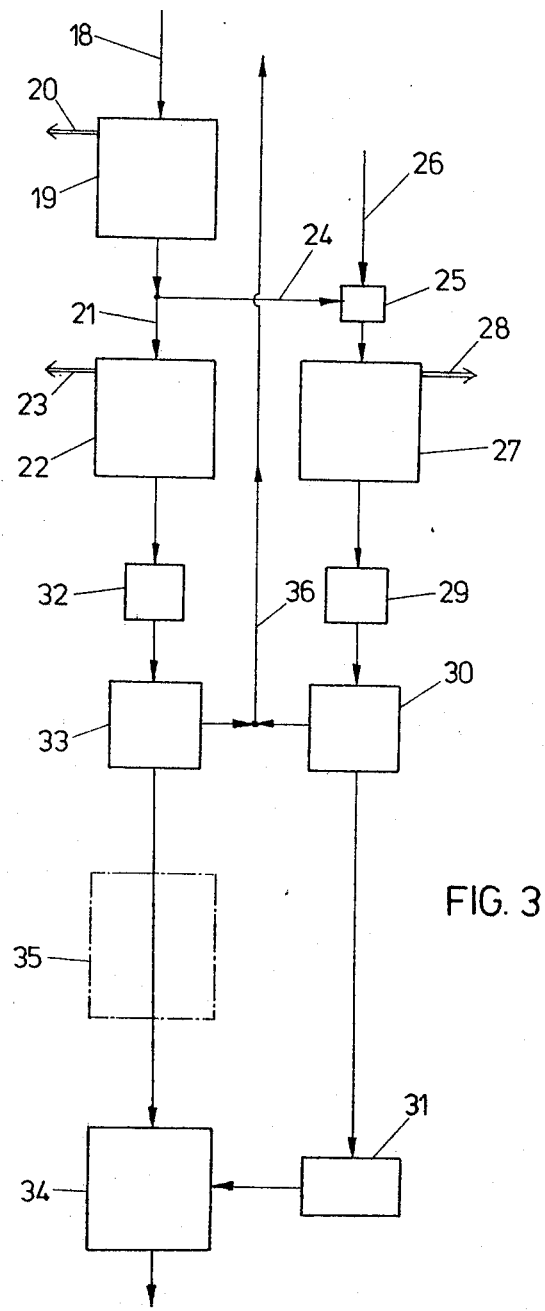
FIG. 3 shows a two-stage digesting system used for demulsification.

In accordance with FIG. 3, fresh sludge is fed through conduit 18 to a first digesting tank 19 for a first digesting step. Gas is discharged from tank 19 through the chimney 20. Part of the predigested sludge is fed via a conduit 21 to a digesting tank 22 and is subjected therein to a second digesting step. Gas can be withdrawn from the digesting tank through the chimney 23. Another part of the sludge subjected to the first digesting step is fed in conduit 24 to a mixer 25 which is supplied with emulsion through conduit 26. A mixture of predigested sludge and emulsion is taken from the mixer 25 and subjected to anaerobic digestion in a tank 27 at least until the emulsion has been substantially completely demulsified. The resulting gases are discharged at 28. The laden sludge particles are subjected to flocculation at 29 and subsequently to dewatering or thickening at 30. The product of the dewatering at 30 may be directly fed to a furnace 31 and, as a rule, has calorific values of 6000 to 8000 kcal/kg of dry solids. The furnace may be used to dry the digested sludge, which has been obtained by the second digesting step in tank 22 and has been subjected to conventional further processing. That sludge has been flocculated at 32 and dewatered at 33. The drying of the sludge at 34 may be effected, if desired, after a fermentation or composting at 35. The dried sludge can then be used for its intended purpose. The water taken from the dewatering stages 30 and 33 may be conducted in a conduit 36 back to the sewage treatment plant or to a receiving body of water.

We claim:

1. A process of demulsifying and coverting emulsions of oils, greases, and fats wherein the emulsions are processed together with sewage sludges, characterized by adding the emulsion to be demulsified and converted to the second digesting tank of a digested sludge or to a sludge liquor which has been obtained by a biological sewage treatment and has been subjected to a first digesting step, which involves mainly an acid fermentation and makes mainly organic acids and $CO_2$ available, the resulting mixture is subjected to a second digesting step that is conducted under anaerobic conditions and in an environment which differs from that of the first step and results mainly in an evolution of methane, said two digesting steps being carried out in two separate digesting tanks.

2. A process according to claim 1, characterized by feeding the emulsion to be converted to a digesting tank for digesting surplus sludge which has been obtained in a biological sewage treatment plant and has been predigested.

3. A process according to claim 1 or 2, characterized by adding emulsion to the predigested sludge or sludge liquor in an amount of up to 0.25 kg oil per kg of dry sludge solids in a continuous process.

4. A process according to claim 1 or 2, characterized by adding emulsion to the sludge or to the predigested sludge or sludge liquor in an amount of 0.25 to 1.0 kg oil per kg of dry sludge solids in a batch process.

5. A process according to claim 1 or 2, characterized by effecting the digestion in an anaerobic environment at temperatures between 20° and 55° C.

6. A process according to claim 1 or 2, characterized by effecting in a continuous process the digestion with a residence time of at least 3 days in the digesting tank.

7. A process according to claim 1 or 2, characterized in that an oil-in-water emulsion to the sludge, digested sludge or sludge liquor.

8. A process according to claim 1 or 2, characterized by adding oil to the sludge, digested sludge or sludge liquor in such a quantity that a C/N ratio in excess of 10 is obtained.

9. A process according to claim 1 or 2, characterized by adding the emulsion is added after not less than 10 days, when the digestion is effected at about 35° C.

10. A process according to claim 1 comprising adding the emulsion after about 14 days and effecting the digestion at about 35° C.

11. A process according to claim 1 comprising adding oil to the sludge, digested sludge, or sludge liquor in such a quantity that a C/N ratio in excess of 15 is obtained.

12. A process according to claim 1 comprising effecting the digestion in an anaerobic environment at temperatures between 30° and 45° C.

13. A process according to claim 1 wherein the emulsion is one from (1) a synthetic oil which is a cutting, cooling, or lubricating fluid, (2) an oil containing sulfur and/or chloride salts, (3) used scrubbing liquor or a degreasing bath.

14. A process according to claim 13 wherein the emulsion is one from (1) a synthetic oil which is a cutting, cooling, or lubricating fluid or (2) an oil containing sulfur and/or chloride salts.

15. A process according to claim 14 wherein the emulsion is one from a synthetic oil which is a cutting, cooling, or lubricating fluid.

16. A process according to claim 1 carried out in the presence of an emulsifying agent.

* * * * *